US006660341B2

United States Patent
Andry et al.

(10) Patent No.: US 6,660,341 B2
(45) Date of Patent: Dec. 9, 2003

(54) TILTED VERTICAL ALIGNMENT OF LIQUID CRYSTALS EMPLOYING INORGANIC THIN FILM COMPOSITION AND ION BEAM TREATMENT

(75) Inventors: Paul S. Andry, Mohegan Lake, NY (US); Praveen Chaudhari, Briarcliff Manor, NY (US); James P. Doyle, Bronx, NY (US); Eileen A. Galligan, Fishkill, NY (US); James A. Lacey, Mahopac, NY (US); Shui-Chih A. Lien, Briarcliff Manor, NY (US); Minhua Lu, Mohegan Lake, NY (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 09/877,803

(22) Filed: Jun. 7, 2001

(65) Prior Publication Data

US 2002/0186336 A1 Dec. 12, 2002

(51) Int. Cl.$^7$ .................. G02F 1/1337; B05D 5/06; C08J 3/28
(52) U.S. Cl. .................. 427/533; 427/551; 427/553; 427/162; 427/249.15; 427/255.29; 428/1.21; 349/124; 349/125
(58) Field of Search .................. 427/162, 164, 427/165, 166, 167, 248.1, 249.15, 255.29, 255.31, 255.37, 255.394, 523, 527, 529, 530, 531, 532, 533, 551, 553; 428/1.2, 1.21, 1.23; 349/123, 124, 125, 130

(56) References Cited

U.S. PATENT DOCUMENTS

| | | | | |
|---|---|---|---|---|
| 5,011,268 A | * | 4/1991 | Kaganowicz | 349/125 |
| 5,666,178 A | * | 9/1997 | Hirata et al. | 349/136 |
| 5,770,826 A | | 6/1998 | Chaudhari et al. | |
| 6,020,946 A | | 2/2000 | Callegari et al. | |
| 6,054,190 A | * | 4/2000 | Ogawa et al. | 427/510 |
| 6,061,114 A | | 5/2000 | Callegari et al. | |
| 6,201,588 B1 | * | 3/2001 | Walton et al. | 349/123 |
| 6,368,681 B1 | * | 4/2002 | Ogawa | 428/1.23 |

* cited by examiner

Primary Examiner—Shrive P. Beck
Assistant Examiner—Wesley Markham
(74) Attorney, Agent, or Firm—Robert M. Trepp

(57) ABSTRACT

A liquid crystal display device includes an alignment layer with constituent materials. The constituent materials have a stoichiometric relationship configured to provide a given pretilt angle. Liquid crystal material is provided in contact with the alignment layer. A method for forming an alignment layer for liquid crystal displays includes forming the alignment layer on a substrate by introducing an amount of material to adjust a stoichiometric ratio of constituent materials wherein the amount is determined to provide a given pretilt angle to the alignment layer. Ions are directed at the alignment layer to provide uniformity of the pretilt angle.

14 Claims, 7 Drawing Sheets

TILTED VERTICAL ALIGNMENT OF LIQUID CRYSTALS EMPLOYING INORGANIC THIN FILM COMPOSITION AND ION BEAM TREATMENT

BACKGROUND OF THE INVENTION

1. Field of the Invention

The present invention relates to liquid crystal alignment, and more particularly to an apparatus and method for preparing surfaces to provide tilted and vertical alignment of liquid crystal material.

2. Description of the Related Art

Liquid crystal (LC) material employed in liquid crystal displays typically relies on alignment layers to establish a stable pretilt angle for the liquid crystal material. Typically, the alignment of the liquid crystals for flat panel liquid crystal displays (LCD) is accomplished by placing a thin film of LC material on a mechanically rubbed polyimide film coated on a suitable substrate. Limitations imposed by the mechanical rubbing method (e.g., creating multiple domains for improving the viewing angle) in conjunction with the difficulty of optimizing polymer materials (e.g., polymers that avoid image sticking) make it highly desirable to use alternative materials and a non-contact LC alignment method.

There are a number of different methods/materials which have been shown to create LC alignment besides rubbing. For example, these methods/materials may include a stretched polymer, a Langmuir Blodgett film, a grating structure produced by microlithography, oblique angle deposition of silicon oxide, and polarized ultraviolet (UV) irradiation of a polymer film.

Non-contact methods to replace rubbing are described in commonly assigned U.S. Pat. No. 5,770,826, incorporated herein by reference, which describes a particularly attractive and versatile LC alignment process based on ion beam irradiation of a polyimide surface. The method places the LCs on a polyimide surface which has been bombarded with low energy (about 100 eV) $Ar^+$ ions. This process has many characteristics which make it suitable for the manufacture of LC displays. This method has been extended to include diamond-like carbon (DLC), amorphous hydrogenated silicon, SiC, $SiO_2$, glass, $Si_3N_4$, $Al_2O_3$, $CeO_2$, $SnO_2$, and $ZnTiO_2$ films as described in commonly assigned U.S. Pat. No. 6,020,946, incorporated herein by reference. Another method for creating an LC alignment layer in a single deposition process has been described in commonly assigned U.S. Pat. No. 6,061,114, incorporated herein by reference.

Ion-beam treatment on DLC films (IB/DLC) for the alignment of liquid crystals has many advantages over conventional rubbed polyimide alignment, such as, non-contact processing, alignment uniformity, etc. Usually, DLC films of about 50 angstroms thick are deposited by plasma enhanced chemical vapor deposition (PECVD), and followed by Ar ion beam irradiation. It is believed that the Ar ion beam destroys the amorphous-carbon rings which have a large collision cross section to the ion beam. The amorphous-carbon rings which have a small or zero collision cross section to the ion beam are preserved. The average direction of the remaining carbon rings align the liquid crystal and generate a pretilt angle. The pretilt angle of IB/DLC alignment is not stable. The pretilt angle tends to decrease when the IB/DLC substrates are in contact with moisture or other components in air. The pretilt angle decreases as a function of storage time in vacuum-sealed LC cells with IB/DLC alignment. In addition, the pretilt angle is not stable under ultra-violet (UV) or violet irradiation.

After ion-beam treatment, the surface of the DLC films are very active due to the ion-beam induced free radicals on the DLC surface. These free radicals tend to react with many chemical species in contact with them. This reaction may change the surface chemistry of the DLC film or change the orientation the carbon rings. As a result, the pretilt angle will degrade.

Vertical alignment liquid crystal displays (LCD) have become one of the top candidates for LCD monitor applications. This is due, in part, to the wide viewing angle and fast response time provided by vertical alignment LCDs. To control declination in the vertical alignment LCD, a certain pretilt angle is needed. However, good vertical alignment, especially with a pretilt angle, is very difficult to obtain.

Conventional alignment methods include surfactance attachments on oblique evaporated silicon oxide surfaces and rubbed side chain polyimides, as described above. The surfactance attachments approach requires double evaporation processing plus a surfactance attachment. This approach is very complicated and the charge holding ratio of the resultant surface is often excessive. The rubbed side chain polyimides approach uses rubbing to generate pretilt angle. This process is difficult to control and leaves rubbing traces on the display.

Using single oblique evaporation of silicon dioxide to obtain vertical and tilted vertical alignment, high quality vertical alignment may be provided. Van der Waals interaction has been used to explain this phenomena. However, the deposition may be slow and may include unconventional semiconductor processes. The vertical alignment of negative dielectric anisotropic liquid crystal (LC) on silicon dioxide is dominated by the van der Waals interaction and not due to the surface morphology. The thin film deposition method is therefore not limited to oblique evaporation. Other thin film deposition methods, such as sputtering, chemical vapor deposition (CVD) and plasma enhanced chemical vapor deposition (PECVD), can be used to produce zero tilt vertical alignment, as well.

However, since the directionality of sputtering, CVD and PECVD are not as good as oblique evaporation, it is difficult to obtain a suitable pretilt angle. For example, sputtered silicon dioxide from a tilted target can give a pretilt angle of 0.4 degrees. This may be enough to control the domain formation, but the response time is slow.

Therefore, a need exists for a reliable generalized method to produce vertical and tilted vertical alignment by a thin film deposition process and ion beam treatment.

SUMMARY OF THE INVENTION

A liquid crystal display device includes an alignment layer with constituent materials. The constituent materials have a stoichiometric relationship configured to provide a given pretilt angle. Liquid crystal material is provided in contact with the alignment layer. A method for forming an alignment layer for liquid crystal displays includes forming the alignment layer on a substrate by introducing an amount of material to adjust a stoichiometric ratio of constituent materials wherein the amount is determined to provide a given pretilt angle to the alignment layer. Ions are directed at the alignment layer to provide the pretilt angle.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 6B is a magnified view of FIG. 6A.

DETAILED DESCRIPTION OF PREFERRED EMBODIMENTS

The present invention solves the problems of film deposition by oblique evaporation. The present invention provides a tilted vertical alignment surface for liquid crystal materials and can adjust the pretilt by providing an inorganic film with a particular material composition. Advantageously, tilted vertical alignment can be achieved by employing ion beam irradiation without rubbing. The pretilt angle can be tuned by the composition of the thin film. The present invention generalizes the use of inorganic film vertical alignment to make the process easier for manufacturing.

Negative dielectric liquid crystal (LC) will align vertically when van der Waals interactions are the dominate force. Since the van der Waals force is a short-range interaction, the existence of any other interactions, such as, influences due to grooves, steric hindrance and/or Pi-electron coupling will override the van der Waals forces resulting in non-vertical alignment.

Diamond-like-carbon (DLC) films are used for homogeneous alignment with ion beam treatment. For DLC films, Pi-electrons (π-electrons) from carbon rings are responsible for the alignment of LC. Since the Pi—Pi interactions of the carbon rings are stronger than the van der Waals interaction, the LC tends be parallel to the DLC substrate or gives planar alignment.

In amorphous silicon (a-Si) films, such a Pi-electron loop will not form, and LC will align perpendicularly. Similar alignment was observed on SiOx and SiNx surfaces.

Figure 1:
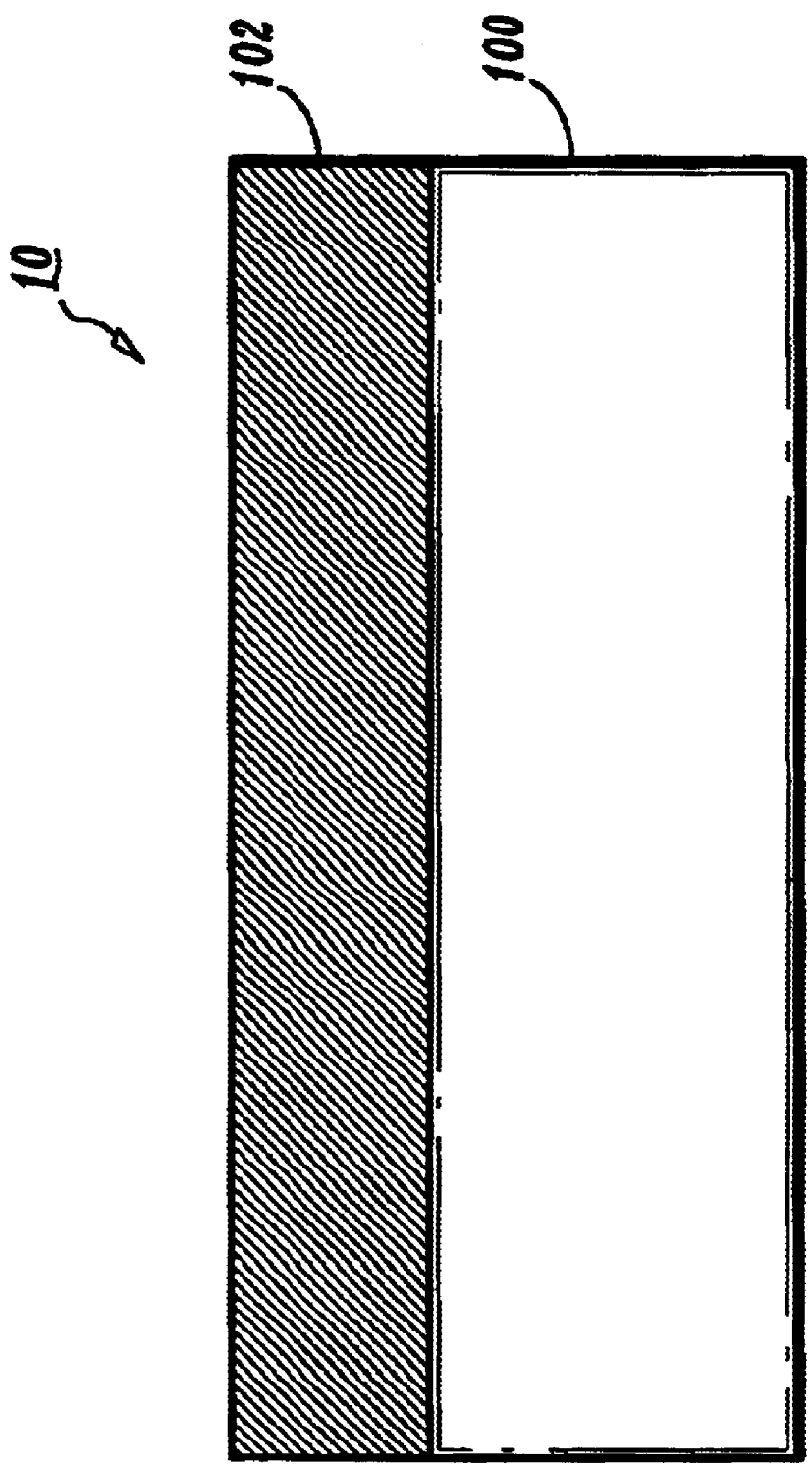
FIG. 1 is a cross-sectional view of a plate having a conductive layer formed thereon in accordance with the present invention.

Referring now in detail to the figures in which like numerals represent the same or similar elements and initially to FIG. 1, a cross-section of a portion of a display device 10 is shown for the formation of an alignment layer for liquid crystal. A plate 100 may include a glass substrate or other transparent substrate, such as a plastic substrate. Plate 100 may include a conductive layer 102 formed thereon. Conductive layer 102 may be continuous across the surface of plate 100 (e.g., to form a common electrode for the display) or patterned to form a plurality of pixels or sub-pixels for the display. Conductive layer 102 preferably includes a transparent conductor, such as for example, indium tin oxide (ITO), indium zinc oxide (IZO) or any other suitable conductive material, such as opaque conductive materials for display circuitry.

Conductive layer 102 may include a plurality of different arrangements or patterns. For example, conductive layer 102 may be adapted for use with twisted nematic (TN), in plane switching (IPS) or any other display mode. Conductive layer 102 may not be employed, for example, when an in-plane switching (IPS) device is employed.

Figure 2:
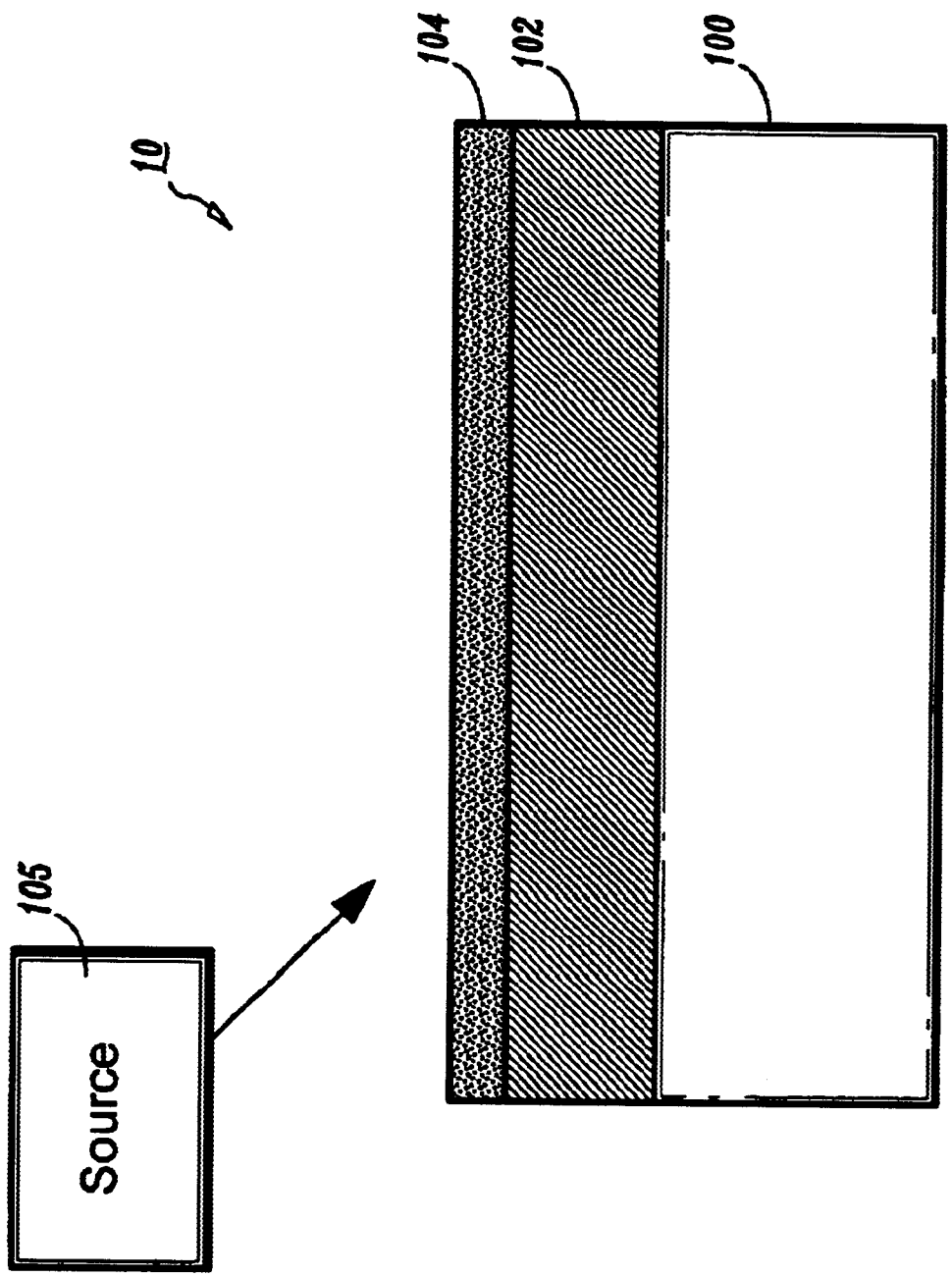
FIG. 2 is a cross-sectional view of the conductive layer of FIG. 1 showing an alignment base layer formed with a predetermined composition to promote pretilt angle in accordance with the present invention.

Referring to FIG. 2, an alignment layer 104 is formed on conductive layer 102 and on substrate layer 100 in areas not covered by layer 102. It is to be understood that the structure on which alignment base layer 104 is formed is described for illustrative purposes and should not be construed as limiting the present invention. Alignment layer 104 preferably includes an inorganic layer. In one embodiment, layer 104 begins with a material with homeotropic alignment tendencies, such as, for example, Si, $SiO_x$, $Si_xN_y$, etc. In an alternate embodiment, layer 104 may begin with a material with homogeneous alignment tendencies, such as, for example, carbon or silicon carbide.

During the formation of alignment layer 104, the composition of layer 104 is adjusted to provide a predetermined pre-tilt angle associated with alignment layer 104. A source 105 is employed to set the composition of alignment layer. The composition of the alignment layer creates a propensity for the layer to provide a stable pretilt angle as a function of the composition alignment layer 104.

Where layer 104 began as a material with homeotropic alignment tendencies, a material with homogenous alignment tendencies may be added. Where layer 104 began as a material with homogenous alignment tendencies, a material with homeotropic alignment tendencies may be added. This results in stoichiometric relationships which provide a given pretilt angle.

When liquid crystal is in contact with alignment layer 104, the Pi—Pi interaction due to carbon atoms will compete with van der Waals interaction which arises from atoms such as Si, O, N, etc. which do not form Pi bonds. Depending on the relative composition of the Carbon atoms to the other atoms, the alignment varies from homogeneous (amorphous carbon (a-C) to homeotropic (a-Si, $SiO_x$, etc.). Silicon carbide ($SiC_x$) provides a system which can be employed to demonstrate the present invention.

Figure 6A:
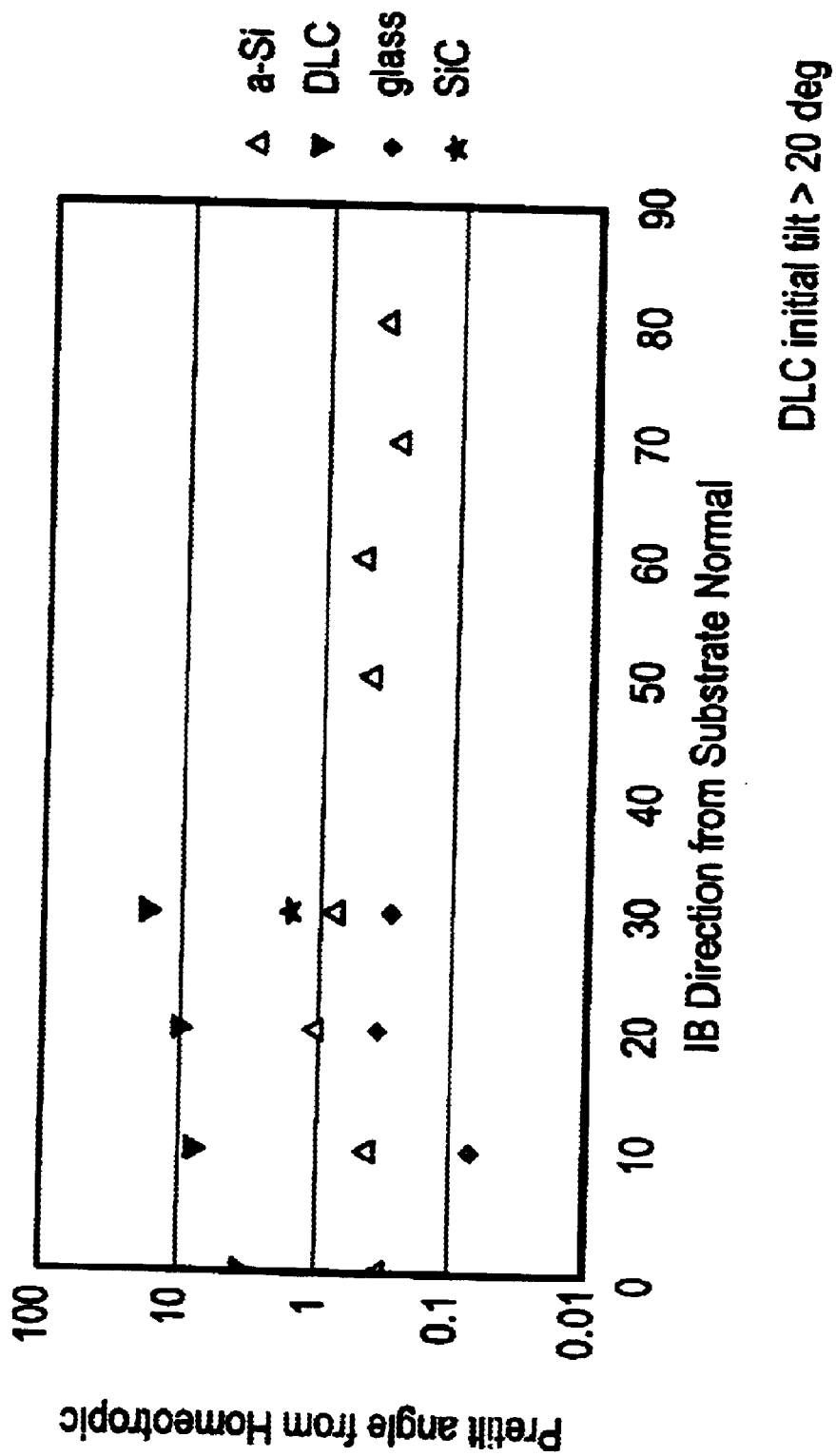
FIGS. 6A and 6B show pretilt angle (from the vertical direction) against ion beam direction for different materials.
Figure 6B:
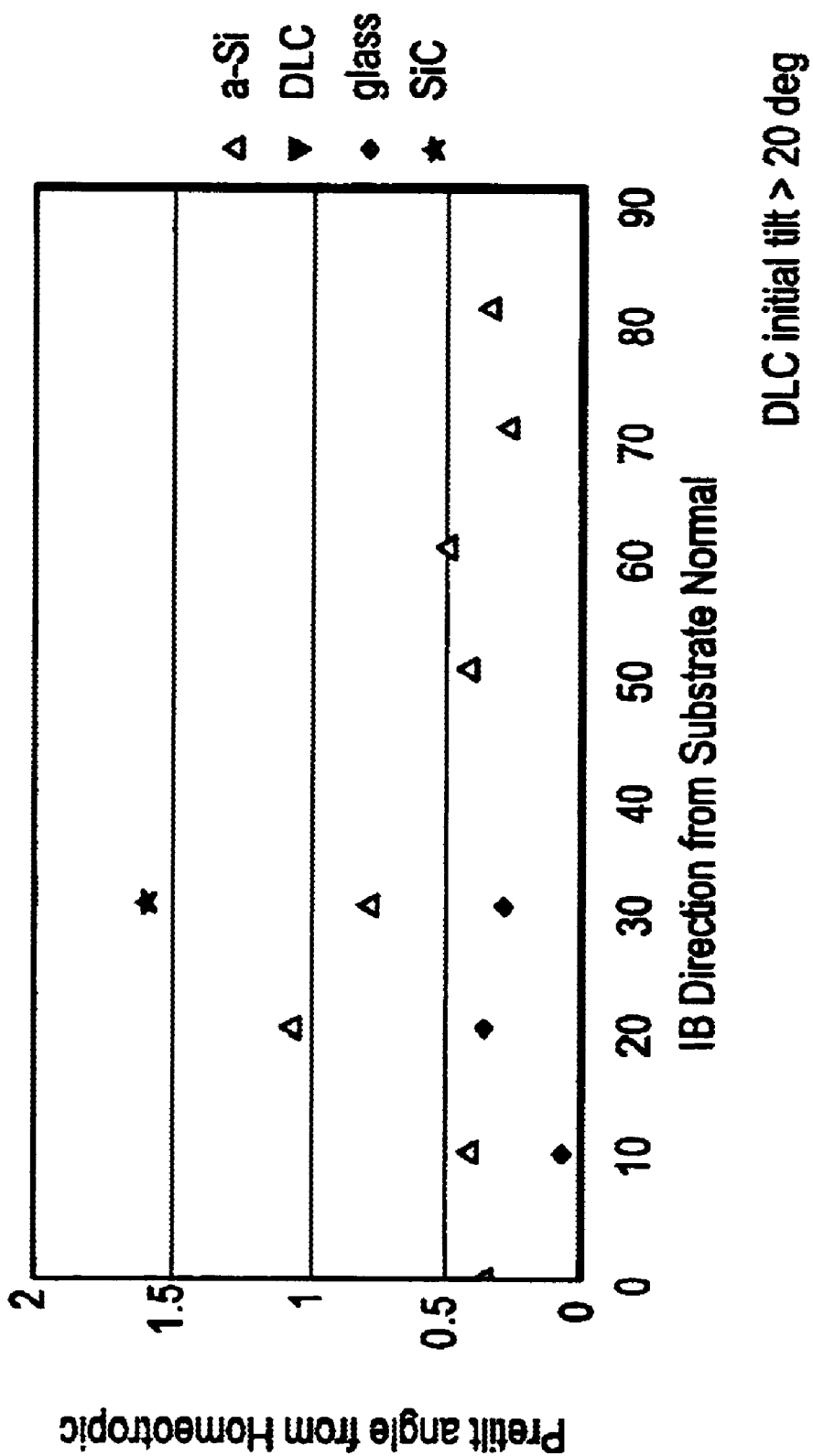

Referring to FIGS. 6A and 6B, pretilt angle from homeotropic is plotted against ion beam direction from the substrate normal for different materials. The materials includes amorphous silicon (a-Si), amorphous carbon (a-C:H or diamond-like-carbon (DLC)), glass ($SiO_x$) and SiC. In accordance with experiments carried out by the inventors, thin films of a-Si, SiC and a-C:H were subjected to ion beam irradiation. Pretilt angles were measured by the crystal rotation method. Pretilt (from homeotropic) for the a-C (DLC) film was very high (e.g., greater than 20 degrees), which means that a-C:H tends to have a homogeneous alignment. For the a-Si film, however, the pretilt angle is very small (e.g., less than 1.0 degrees). Liquid crystal tends to align homeotropically for a-Si. By adding C into the a-Si, the pretilt angle of SiC increases. In accordance with the present invention, by varying the concentration of carbon in the film, the pretilt angle can be adjusted within a wide range of angles.

FIG. 6B is a magnified view of FIG. 6A. FIGS. 6A and 6B show the pretilt angle (from the vertical direction) against ion beam direction. The pretilt angle of a-C:H is over 15 degrees and not stable. The pretilt angle for a-Si is less than 0.5 degrees and the alignment is stable. By adding carbon to a-Si, the pre-tilt angle increases to 1.5 degrees, which is suitable for display applications.

Referring again to FIG. 2, in one example, a silicon carbide layer (104) may be formed to provide a given pretilt angle. During formation of a silicon carbide (SiC) alignment layer 104, a sputtering process may be employed, although other processes may be employed. In accordance with the present invention, the sputtering process employs a larger target area (e.g., source 115) for carbon to provide a predetermined amount of carbon in the SiC alignment layer. This results in a $SiC_x$ alignment layer where x is greater than zero is set in accordance with an amount of pretilt angle needed for a particular display device. x can by any positive integer depending on the pretilt needed. in other embodiments, a silicon layer is formed first followed by treatment of the silicon with carbon to obtain the desired stoichiometric relationship to provide a given pretilt angle.

Illustratively, a pretilt angle provided by $SiC_x$, where x is about 2, may provide about 4–5 degrees of pretilt, while a pretilt angle provided by $SiC_x$, where x is about 1.5, is between about 0.5 degrees and 1 degree.

For a silicon oxide or a silicon nitride alignment layer or film 104, $N_2$ or $O_2$, respectively, may be introduced to form a $SiO_yN_z$ layer, where y and z are adjusted to provide a pretilt angle between about 0 to one degree. y and z are preferably adjusted according to the deposition process for alignment layer 104. A pretilt angle about 0.4 degrees can be obtained by ion beam treated $SiO_2$. $Si_2N_3$ surfaces provide a more planar pretilt angle as compared to $SiO_2$. Therefore, $SiO_yN_z$ can be used to tune the pretilt angle for liquid crystal by adjusting the stoichiometric ratio (e.g., adjusting y and z).

Alignment layer 104 may be formed by a plurality of different processes, for example, chemical vapor deposition (CVD), plasma enhanced CVD, sputtering, etc. These processes are modified to provide a desired composition of the deposited alignment layer 104.

Figure 3:
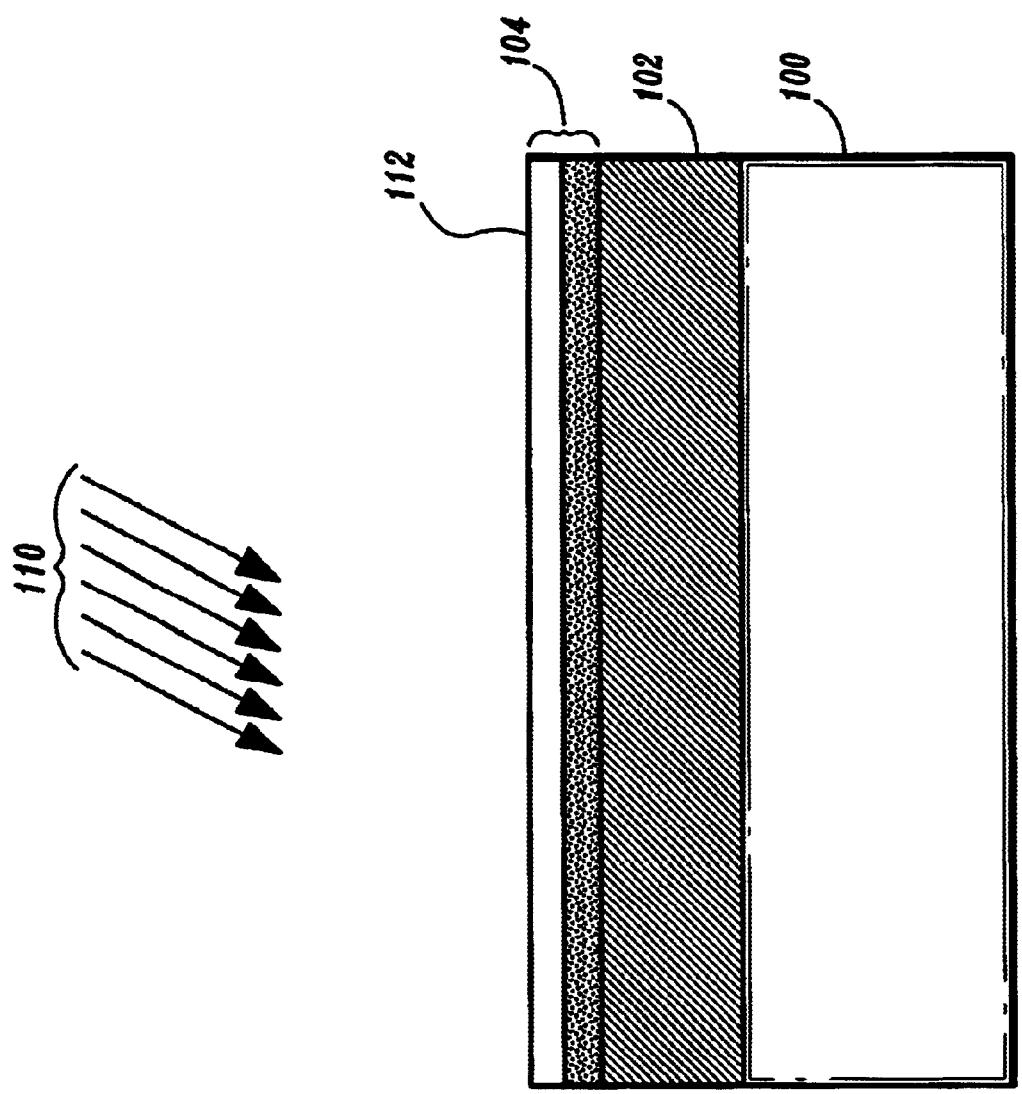
FIG. 3 is a cross-sectional view showing the alignment layer of FIG. 2 being treated by an ion beam treatment in accordance with the present invention.

Referring to FIG. 3, alignment layer 104 is treated with an ion beam 110 to create a surface alignment layer 112. It is noted that ion bombardment may be performed simultaneously with the formation of layer 104. Surface 112 interacts with the LC (after a display cell is made) and acts as an alignment layer. Advantageously, ion beam 110 is employed to treat alignment layer 104 to provide a pretilt angle to the surface. Ion beam treatment provides unidirectional and controllable pretilt. Pretilt may be generated directly when only oblique deposition is used. For large areas, it is difficult to obtain sufficient and uniform pretilt due to divergence in deposition angle.

In alternate embodiments, ion beam 110 may include Ar or a mixture of Ar and a reactive gas for saturating dangling bonds, and ion bombardment may be followed by immersing surface 112 in a gas or liquid to saturate dangling bonds.

An additional treatment to surface layer 112 may be carried out subsequent to ion bombardment. Such treatments, called "quenching", may include subjecting surface layer 112 to an ambient chemistry 114 (FIG. 4), which may include a gas, plasma, atoms or liquid.

Figure 4:
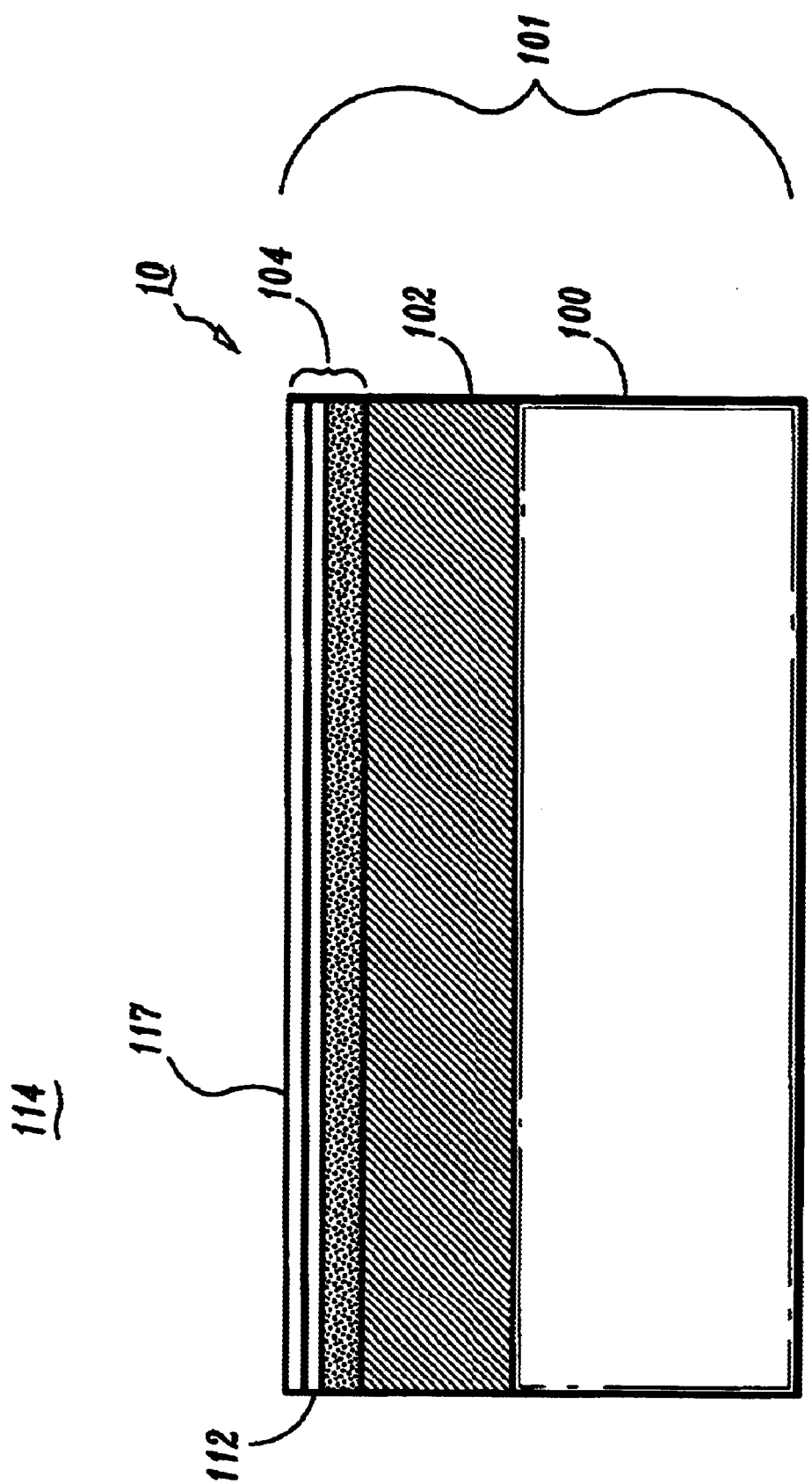
FIG. 4 is a cross-sectional view of an alternate embodiment which shows a quenching step after the ion beam treatment in accordance with the present invention.

Referring to FIG. 4, a chemically modified surface 117 is formed as a result of quenching and/or ion beam treatment in accordance with the present invention. Layer 117 is now substantially free from dangling bonds and free radicals which could degrade properties of a liquid crystal display. A substrate 101 is now formed for use in a liquid crystal display device.

Figure 5:
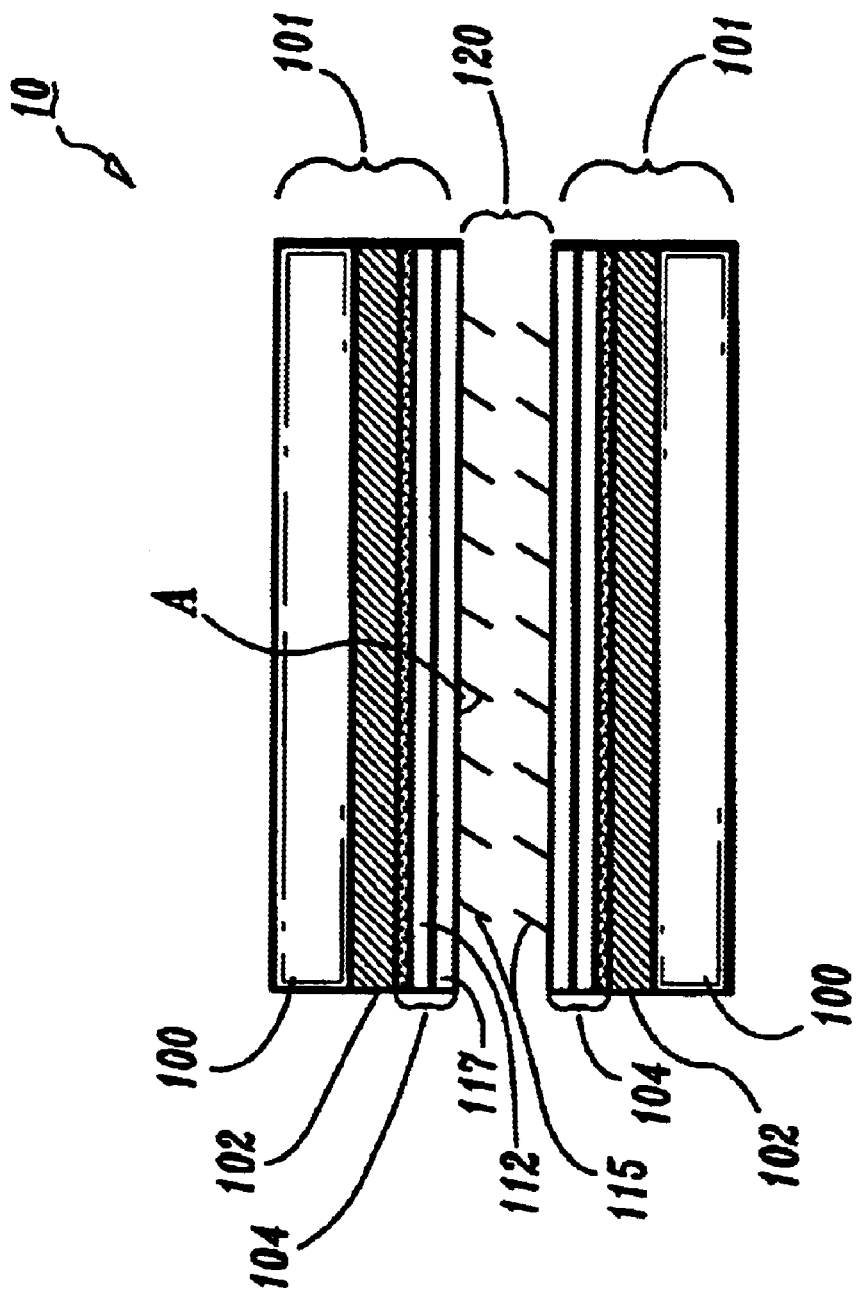
FIG. 5 is a cross-sectional view showing a liquid crystal display in accordance with the present invention.

Referring to FIG. 5, a portion of a liquid crystal display device 10 is illustratively shown in accordance with the present invention. A liquid crystal material 115 is disposed in a gap 120 between substrates 101. Molecules of liquid crystal material 115 assume a pretilted orientation (angle A) in accordance with the composition of layer 104 as modified by ion beam bombardment (layer 112) and/or quenching (layer 117).

It is to be understood that the present invention may be employed in twisted nematic (TN), in plane switching (IPS) or any other display mode, for example, multiple domain IPS mode structures, etc. Other display structures or layers may be employed in accordance with the present invention in addition to or instead of the layers shown in the FIGS.

The present invention solves the problems associated with film deposition by oblique evaporation. The tilted vertical alignment on inorganic films can be achieved by non-rubbing ion beam irradiation. The pretilt angle can be tuned by the composition of the thin film.

Having described preferred embodiments of tilted vertical alignment of liquid crystals employing inorganic thin film composition and ion beam treatment (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for controlling a pretilt angle and forming an alignment layer for liquid crystal displays, comprising the steps of:

forming an alignment layer on a substrate by introducing an amount of material to adjust a stoichiometric ratio of constituent materials wherein the amount is determined to provide a given pretilt angle to the alignment layer; and directing ions at the alignment layer to control uniformity of the pretilt angle.

2. The method as recited in claim 1, wherein the step of directing ions includes employing an ion beam incident on a surface of the alignment layer.

3. The method as recited in claim 1, wherein the material includes $SiC_x$ and introducing the amount of material to adjust a stoichiometric ratio of constituent materials includes introducing carbon to adjust x.

4. The method as recited in claim 1, wherein the material includes one of silicon oxide and silicon nitride and introducing the amount of material to adjust a stoichiometric ratio of constituent materials includes introducing the other of nitrogen and oxygen to form silicon oxynitride.

5. The method as recited in claim 1, wherein the material includes a material having Pi-electrons.

6. The method as recited in claim 1, wherein the steps of forming and directing are performed concurrently.

7. The method as recited in claim 1, wherein the alignment layer provides tilted homeotropic alignment for liquid crystal.

8. A method for forming an alignment layer for liquid crystal displays, comprising the steps of:

forming an alignment layer on a substrate which includes a first material which provides homeotropic alignment;

introducing an amount of a second material, which provides more homogeneous alignment than the first material, in an amount determined to provide a given pretilt angle to the alignment layer; and directing ions at the alignment layer to control the uniformity of the pretilt angle.

9. The method as recited in claim 8, wherein the step of directing ions includes employing an ion beam incident on a surface of the alignment layer.

10. The method as recited in claim 8, wherein the first material includes Si and the step of introducing includes introducing carbon to adjust pretilt.

11. The method as recited in claim 8, wherein the first material includes one of silicon oxide and silicon nitride and the step of introducing includes introducing the other of nitrogen and oxygen as the second material to form silicon oxynitride.

12. The method as recited in claim 8, wherein the second material includes a material having Pi-electrons.

13. The method as recited in claim 8, wherein the steps of introducing and directing are performed concurrently.

14. The method as recited in claim 8, wherein the alignment layer provides tilted homeotropic alignment for liquid crystal.

* * * * *